Aug. 19, 1958

R. B. MATTHEWS 2,848,168

FLOW CONTROL DEVICE

Filed April 6, 1955

INVENTOR.
Russell B. Matthews
BY
Seegert & Schwalbach
Attys.

Aug. 19, 1958   R. B. MATTHEWS   2,848,168
FLOW CONTROL DEVICE
Filed April 6, 1955   2 Sheets-Sheet 2

INVENTOR.
Russell B. Matthews
BY
Seegert & Schwalbach
Attys

United States Patent Office 2,848,168
Patented Aug. 19, 1958

2,848,168

FLOW CONTROL DEVICE

Russell B. Matthews, Wauwatosa, Wis., assignor to Baso Inc., Milwaukee, Wis., a corporation of Wisconsin Application April 6, 1955, Serial No. 499,631

8 Claims. (Cl. 236—50)

This invention relates to flow control devices and more particularly to gas valves having embodied therein improved means for controlling gas flow therethrough comprising a foraminous member and a coacting liquid for control of the flow of gas through said member.

It has been standard practice to control the flow of gaseous fluid by the use of valving devices which are basically composed of a valve seat and a cooperating valve mmeber. While many improvements in conventional valve seats and valve members have been presented through the years, it has always been difficult to obtain satisfactory performance at low cost.

It is a general object of the present invention to provide an inexpensively constructed device for controlling gaseous flow in a novel manner and having embodied therein a foraminous member pervious to said gas flow and a control liquid impervious to said gas flow and coacting with said foraminous member impervious to said liquid for regulation of the flow of gas through said member.

Another object of the invention is to provide a device of the aforementioned character wherein a gas flow through the foraminous member is controlled by covering and uncovering surface portions of said member with said control liquid.

Still another object of the invention is to provide a device as above described wherein the control liquid is disposed within a variable volume receptacle and the surface area of the foraminous member covered by said control liquid, and hence the gas flow through said member, is varied by changing the volume of said receptacle.

More specifically, the invention provides a flow control device of the type characterized having embodied therein condition responsive means for varying the volume of said receptacle to vary the gaseous flow in accordance with changes in the condition.

An object of the invention is to provide a device of the aforementioned character which is self-powered.

A further object of the invention is to provide a device of the aforementioned character wherein the gas flow is variable directly and continuously in accordance with changes in the ambient temperature to provide modulation of said gas flow.

One other object of the invention is to provide an improved fuel control device of the class described which is relatively simple in construction and inexpensive to manufacture and is otherwise well adapted for the purposes described.

The novel features that I consider characteristic of my invention are set forth with particularity in the appended claims. The invention itself, however, both as to its organization and its method of operation together with additional objects and advantages thereof will best be understood by the following description of specific embodiments when read in connection with the accompanying drawings, in which:

Figure 1:
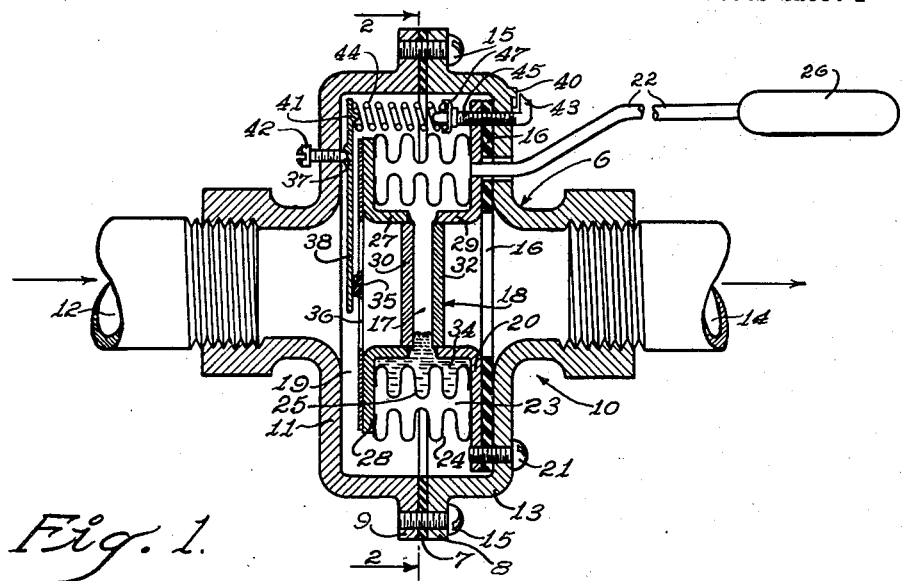
Figure 1 is a vertical sectional view of one form of flow control device constructed in accordance with the teachings of the invention.

While the invention may take a number of forms, the form of the invention selected for illustration in Figure 1 of the drawings, is indicated by the numeral 10 and comprises a flow control device which has a control body 6 including a pair of complementary cup-shaped body members 11 and 13 which define a cylindrical chamber 19. The members 11 and 13 are formed with suitable inlet and outlet connections for receiving pipes 12 and 14 as shown, and said members have peripheral flanges 8 and 9 which are sealingly joined, as through a gasket 7, by fastening means which may take the form of a plurality of bolts 15.

The control body 6 is adapted to permit the flow therethrough of a gas to be controlled and means is provided within said chamber for controlling said gas flow, said means comprising a variable volume container 18. Said container 18 comprises an inner enclosure 17 and an annular outer enclosure 23 in surrounding relation therewith. The outer enclosure 23 may include an annular inner bellows wall 25 and a concentric annular outer bellows wall 24 the opposite ends of said bellows walls being sealingly joined as by soldering to annular end walls 20 and 28. The end walls 20 and 28 are formed with opposing axially inwardly directed flanges to form tubular conduit portions 27 and 29 as shown. A pair of foraminous metal disks or members 30 and 32 are peripherally fixed to extend across the inner ends of the conduit portions 27 and 29, as by solder or other suitable gas tight fastening means.

The circular inner enclosure 17 is defined by the inner surfaces of the inner bellows wall 25, a portion of the end plates 20 and 28 and the axial flanges 27 and 29 together with foraminous disks 30 and 32. As shown in Figure 1, the circular inner enclosure 17, as viewed in an axial cross section, is of roughly dumbbell shape, the narrow restricted central portion of said enclosure being defined by the relatively closely spaced foraminous disks 30 and 32.

The container 18 is disposed in the direct pathway of the gas through the control body 6 and is held in operative position by screws 21 threaded into peripheral portions of the end wall 20 and sealing the latter to the body member 13 as through a gasket 16. Thus, gas flow through the control body 6 must be through the foraminous disks 30 and 32 and the enclosure 17 therebetween.

Disposed within the inner enclosure 17 is a control liquid 34 which is impervious to the gas flow and to which the foraminous disks are impervious. The liquid is adapted to cover portions of the inner surfaces of the disks 30 and 32, and the amount of gas flow through the disks 30 and 32 and hence through the control device 10 is determined by the inner surface area of said disks left uncovered by the control liquid 34.

Means is provided for varying the inner surface area of the disks 30 and 32 through which the gas may flow, said means including a condition responsive sub-atmospheric volatile fluid fill disposed within the enclosure 23. The device 10 is rendered responsive to an ambient condition at a point remote therefrom by means of a capillary tube 22 extending through an aperture of the body member 13 and connecting the enclosure 23 with a sensing bulb 26 located at said remote point.

Means are provided for adjusting the control point of the device 10, said means comprising a spider 36 having a centrally disposed raised bearing surface 35 and a plurality of radially extending arms which are fixed to the annular end wall 28. The bearing surface 35 is engaged by one end of a pivotal lever arm 38, having an intermediate bearing recess 37 for receiving the set screw 42 which is threaded into an aperture in the housing member 11 as shown. The other end of the lever 38 is formed with a spring centering nib 41 which is adapted to receive one end of a biasing spring 44, the other end of said spring surrounds the inner end portion of an adjustment screw 45 and engages a collar 47 fixed thereon. The adjustment screw 45 is threaded through the body member 13 and terminates externally in a manually engageable arm 43. The arm 43 may be provided with pointer means which coacts with indicia on the body member 13, which may take the form of a raised calibrated dial 40 for indicating the control point for which the device 10 is set. Adjustment of the setting of the arm 43 adjusts the axial position of the screw 45 and thereby varies the loading afforded by the spring 44 on the spider 36 and hence axially on the outer enclosure 23.

In operation of the improved device, the fill within the enclosure 23 expands and contracts in response to temperature changes sensed by the bulb 26 and thereby simultaneously increasing or decreasing the volumes of the enclosures 17 and 23 by changing the axial dimension thereof. Upon reduction of the volume of the enclosure 17, the level of the liquid 34 is thereby caused to rise and cover the previously uncovered inner surface portions of the foraminous disks 30 and 32 and thereby prevent flow of the gas through said portions and hence reduce the total flow of gas through said device. Conversely, upon an increase in volume of the chambers 17 and 23 responsive, for example, to an increase in temperature, the level of the control liquid 34 recedes to increase the uncovered inner surface area of said disks 30 and 32 thereby increasing the total flow of gas through said device.

In the illustrated form of the invention the amount of gas which may flow through said device is varied directly and continuously in accordance with temperatures sensed by the bulb 26, thereby affording modulation of said gas flow in accordance with said temperature changes, said form being particularly well adapted for use as a refrigerator control.

The foraminous disks 30 and 32 may be composed of any suitable material which will accomplish the objects of the invention. Two examples of material of which the disks may be made are metal made by sintering pure nickel powder and metal made by sintering stainless steel powder. An example of a suitable control liquid 34 for use with the aforementioned disks is mercury.

Figure 2:
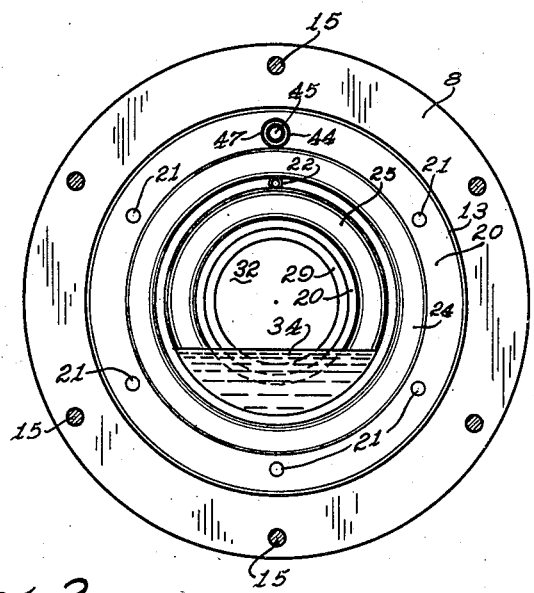
Figure 2 is a transverse vertical sectional view taken approximately along lines 2—2 of Figure 1.
Figure 3:
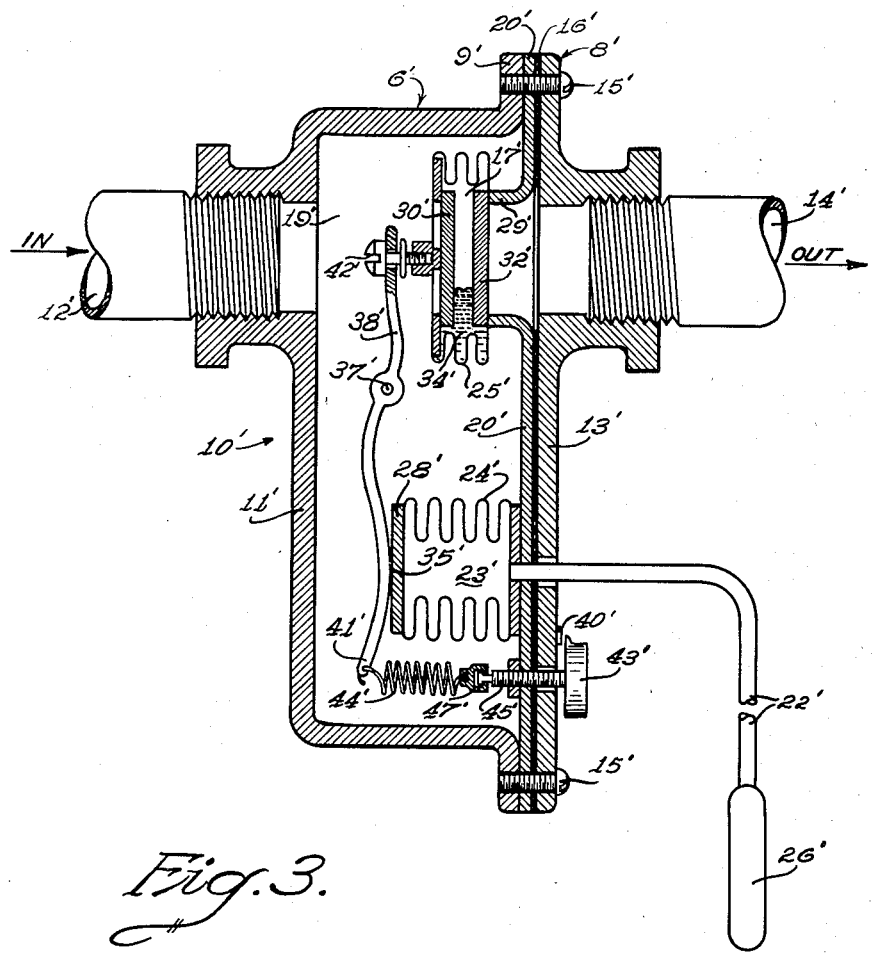
Figure 3 is a view similar to Figure 1 showing a modified form of the invention.

Figure 3 of the drawings shows a modified form of the invention which is similar in many respects to the form shown in Figures 1 and 2. The parts indicated in primed numerals in Figure 3 correspond to similar parts in Figures 1 and 2 indicated by the same numerals unprimed. As shown in Figure 3, the outer vapor filled bellows enclosure 23' is non-coaxial with and spaced away from the liquid 34' filled enclosure 17'. The spaced enclosures 17' and 23' are connected by a pivotal linking member 38' which transmits a loading force to vary the control point of the device 10' and said linking member 38' also inversely transmits the changes in volume of enclosure 23' to the enclosure 17'. Thus the coaction of the enclosures 17' and 23' as shown in Figure 3 is the reverse of the coaction of the embodiment illustrated in Figures 1 and 2, i. e. as shown in Figure 3 an increase in volume of the enclosure 23' causes a decrease in volume in enclosure 17' and vice versa. The form of the invention shown in Figure 3 is particularly well adapted for use as, for example, a control for thermostatically controlling the amount of heat to hold a given area at a predetermined heat level.

Although I have shown and described certain specific embodiments of my invention, I am fully aware that many modifications thereof are possible. My invention, therefore, is not to be restricted except insofar as is necessitated by the prior art and by the spirit of the appended claims.

What is claimed as the invention is:

1. A condition responsive flow control device comprising, container means capable of retaining a liquid and defining a passage for flow therethrough of a fluid to be controlled, said container means comprising spaced relatively movable wall portions at least one of which is foraminous and is in the path of said fluid flow, a second fluid disposed within said container means, said second fluid being impervious to said controlled fluid, and said foraminous wall portion being impervious to said second fluid and pervious to said controlled fluid, and condition responsive actuating means associated with said container means for varying the spacial relationship between said wall portions and thereby moving said second fluid into and out of covering relation with respect to a surface of said foraminous wall portion in accordance with changes in a condition, said second fluid preventing flow of said controlled fluid through the portion of said foraminous wall surface so covered, wherefore the flow of the controlled fluid through said container means is varied in accordance with variations in the condition.

2. A flow control device comprising: a variable volume container affording a passage for a gas to be controlled and comprising relatively movable spaced opposing side walls, one formed with an inlet opening and the other formed with an outlet opening, a first foraminous metal disk covering said inlet opening and a second foraminous metal disk covering said outlet opening; a liquid impervious to said controlled fluid and disposed within said container, said foraminous disks being impervious to said liquid and pervious to said gas; condition responsive means for effecting relative approaching and separating movement of said side walls for reducing and increasing the volume of said container and thereby effecting corresponding movement of said liquid into and out of covering relation with respect to the inner surface portions of said foraminous disks, said liquid preventing flow of said gas through said surface portions when the latter are covered by said liquid and permitting flow of said gas through both of said disks when said liquid is not in a covering relation with respect to said surface portions.

3. A flow control device comprising, a variable volume container affording a passage for a gas to be controlled and comprising relatively movable spaced opposing side walls, one formed with an inlet opening and the other formed with an outlet opening, a first foraminous metal disc covering said inlet opening and a second foraminous metal disc covering said outlet opening; a liquid impervious to said controlled fluid and disposed within said container, said foraminous discs being impervious to said liquid and pervious to said gas; condition responsive actuating means associated with said container and operable upon predetermined changes in the condition for effecting relative approaching and separating movement of said side walls for reducing and increasing the volume of said container and thereby effecting corresponding movement of said liquid into and out of covering relation with respect to the inner surface portions of said foraminous discs, said liquid preventing flow of said gas through said surface portions when the latter are covered by said liquid and permitting flow of said gas through both of said discs when said liquid is not in a covering relation with respect to said surface portions; and means associated with said container for selectively varying the effect of said condition responsive means thereon to thereby selectively determine the condition preventing flow of gas therethrough.

4. A flow control device comprising: a variable volume container affording a passage for a gas to be controlled and comprising relatively movable spaced opposing side walls, one formed with an inlet opening and the other formed with an outlet opening, a first foraminous member covering said inlet opening and a second foraminous member covering said outlet opening; a liquid impervious to said controlled fluid and disposed within said container, said foraminous members being impervious to said liquid and pervious to said gas; condition responsive means for effecting relative approaching and separating movement of said walls for reducing and increasing the volume of said container and thereby effecting corresponding movement of said liquid into and out of covering relation with respect to the inner surface portions of said foraminous members, said liquid preventing flow of said gas through said surface portions when the latter are covered by said liquid and permitting flow of said gas through both of said foraminous members when said liquid is not in a covering relation with respect to said surface portions.

5. A flow control device comprising: a variable volume bellows affording a passage therethrough for a gas to be controlled and comprising relatively movable spaced opposing side walls, one formed with an inlet opening and the other formed with an outlet opening, a first foraminous metal disc covering said inlet opening and a second foraminous metal disc covering said outlet opening; a liquid impervious to said controlled fluid and disposed within said container, said foraminous discs being impervious to said liquid and pervious to said gas; temperature responsive means spaced away from said bellows and operatively connected thereto for effecting relative approaching and separating movement of said side walls for reducing and increasing the volume of said container and thereby effecting corresponding movement of said liquid into and out of covering relation with respect to the inner surface portions of said foraminous discs upon predetermined changes in temperature, said liquid preventing flow of said gas through said surface portions when the latter are covered by said liquid and permitting flow of said gas through both of said discs when said liquid is not in a covering relation with respect to said surface portions.

6. A flow control device comprising, variable volume bellows means affording a passage for a gas to be controlled and comprising relatively movable spaced opposing side walls, one formed with an inlet opening and the other formed with an outlet opening, a first foraminous metal disc covering said inlet opening and a second foraminous metal disc covering said outlet opening; a liquid impervious to said controlled fluid and disposed within said container, said foraminous discs being impervious to said liquid and pervious to said gas; temperature responsive means associated with said bellows means for effecting relative approaching and separating movement of said side walls upon predetermined changes in the temperature for effecting corresponding reducing and increasing of the volume of said bellows means and thereby effecting corresponding movement of said liquid into and out of covering relation with respect to the inner surface portions of said foraminous discs, said liquid preventing flow of said gas through said surface portions when the latter are covered by said liquid and permitting flow of said gas through both of said discs when said liquid is not in a covering relation with respect to said surface portions; and means associated with said bellows means for selectively varying the effect of said temperature responsive means thereon to thereby selectively determine the condition preventing flow of gas therethrough.

7. A flow control device comprising, a variable volume bellows capable of retaining a liquid therein and defining a passage for a fluid to be controlled, said bellows having at least one foraminous side wall disposed in the path of said fluid, a liquid disposed within said bellows, said liquid being impervious to said controlled fluid, and said foraminous wall being impervious to said liquid and pervious to said controlled fluid, temperature responsive actuating means associated with said bellows for reducing and increasing the volume of said bellows in accordance with changes in temperature to effect corresponding movement of said liquid within the bellows into and out of covering relation with respect to the inner surface of said foraminous side wall, said liquid preventing flow of said controlled fluid through said surface portions of said foraminous wall covered thereby, wherefore the flow of the controlled fluid through said bellows is varied in accordance with changes in temperature.

8. A flow control device comprising a variable volume bellows capable of retaining a liquid therein and defining a passage for a fluid to be controlled, said bellows having a pair of spaced foraminous side wall portions disposed in the path of said fluid, a liquid metal disposed within said bellows, said liquid metal being impervious to said controlled fluid, and said foraminous wall portions being impervious to said liquid metal and pervious to said controlled fluid, temperature responsive actuating means associated with said bellows for reducing and increasing the volume of said bellows in accordance with changes in temperature to effect corresponding movement of said liquid metal within the bellows into and out of cover relation to the inner surfaces of said foraminous side wall portions, said liquid metal preventing flow of said control fluid through said surface portions covered thereby, wherefore the flow of the controlled fluid through said bellows is varied in accordance with changes in temperature.

References Cited in the file of this patent

UNITED STATES PATENTS

| | | |
|---|---|---|
| 930,404 | Moore | Aug. 10, 1909 |
| 1,770,012 | Randall | July 8, 1930 |
| 2,538,436 | Weinberg | Jan. 16, 1951 |
| 2,588,214 | Dawson | Mar. 4, 1952 |
| 2,613,305 | Nolcken | Oct. 14, 1952 |
| 2,711,752 | Schmidt | June 28, 1955 |

FOREIGN PATENTS

| | | |
|---|---|---|
| 348,097 | France | Jan. 27, 1905 |